United States Patent
Hanley

[19]

[11] Patent Number: 6,097,966
[45] Date of Patent: *Aug. 1, 2000

[54] WIRELESS ACCESS FOR LOCAL EXCHANGE CARRIERS

[75] Inventor: Donald V. Hanley, McKinney, Tex.

[73] Assignee: Nortel Networks Limited, Montreal, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/871,007

[22] Filed: Jun. 6, 1997

[51] Int. Cl.⁷ ..................................................... H04B 1/38
[52] U.S. Cl. ........................ 455/555; 455/461; 455/422; 455/462
[58] Field of Search .................................... 455/461, 555, 455/422, 424, 426, 428, 433, 436, 445, 462

[56] References Cited

U.S. PATENT DOCUMENTS

| | | | |
|---|---|---|---|
| 5,040,177 | 8/1991 | Martin | 455/461 |
| 5,353,331 | 10/1994 | Emery et al. | 455/461 |
| 5,440,613 | 8/1995 | Fuentes | 455/555 |
| 5,469,496 | 11/1995 | Emery et al. | 455/461 |
| 5,581,596 | 12/1996 | Hogan . | |

FOREIGN PATENT DOCUMENTS

WO 93/18606   9/1993   WIPO .

*Primary Examiner*—Daniel S. Hunter
*Assistant Examiner*—Darnell R. Armstrong
*Attorney, Agent, or Firm*—John D. Crane

[57] ABSTRACT

The Mobility Node (101) of the present invention maps signals, dialed digits, or other information from the mobile (140–142) to the appropriate protocols of the local exchange carrier's (LEC) Class 5 switch (120–123) and vice versa. If the signal does not have an LEC or base station equivalent, the Mobility Node (101) performs the appropriate processing. Multiple Mobility Nodes (101) are connected by a predetermined protocol link to enable inter-system communication.

7 Claims, 8 Drawing Sheets

WIRELESS ACCESS FOR LOCAL EXCHANGE CARRIERS

BACKGROUND OF THE INVENTION

I. Field of the Invention

The present invention relates to radio communications. More particularly, the present invention relates to wireless access to a local exchange carrier network.

II. Description of the Related Art

The availability of personal communication services (PCS) in the 1.9 GHz band is a growing segment of the wireless market. PCS is a boon to the holders of the bandwidth licenses. The wireline (local exchange carriers) and cellular operators, however, face losing subscribers because of this new technology.

The average subscriber is not likely to know or care about the subtle technology differences between cellular and PCS. It is generally expected that the cellular operators will retain the high-speed, high-mobility subscribers while the PCS operators are more likely to gain the low-speed, low-mobility subscribers.

The local exchange carriers (LECs) are at a severe disadvantage due to their extremely large and expensive telephony infrastructure that is mobility-incapable. Mobility has been shown to be of high value to customers even though, most of the time, they need only basic voice services.

There are currently a number of options that provide subscribers wireless access to wireline services. These options include wireless local loop, cellular/PCS overlay, and Generic-C. These technologies all provide some level of mobility but also have some limitations.

Wireless local loop, with the in-building equivalent Wireless Adjunct, are designed to replace the last few yards of copper wire to the subscriber's telephone with a radio link. Various wireless local loop solutions employ a variety of RF technologies, but their general characteristics are similar: they appear to the host LEC office as a set of subscriber lines and convert the signaling transmitted over the RF interface into the signaling required by the LEC and vice versa. A wireless local loop solution is little more than a protocol converter for wireless telephones.

The primary advantage of a wireless local loop is cost. An RF interface is often less expensive than a copper loop, especially in markets that do not have an extensive telecommunications infrastructure. However, wireless local loop solutions do not offer much in the way of subscriber mobility, other than that which is inherent in a radio link. Hand-off is not available nor is the ability to roam away from the home LEC office.

The cellular/PCS overlay is a well established technology that is widely available. The cellular/PCS overlay provides full wireless access and roaming capabilities throughout the LEC region. The cellular/PCS overlay is a cellular or PCS system (or network of systems) that covers the same geographic region as the LEC network. Wireless and wireline subscribers may freely call between these networks, but are served solely by their own network.

There are a number of drawbacks to the cellular/PCS overlay. The primary disadvantage is that the cellular/PCS network lacks service integration with the LEC network. The overlaid cellular or PCS network is entirely self-contained and separate from the LEC network. The only point of contact between the two networks is the tandem trunks connecting them. The operating company can offer full mobility and roaming as part of their business but cannot offer their wireline services to their wireless subscribers and vice versa.

Generic-C attempts to combine wireless local loop-like radio access with cellular or PCS-like networking. Unfortunately, the standard is still being defined and requires advanced telecommunication services, such as ISDN and advanced intelligent networking (AIN), to be deployed within the LEC network in order to function.

The average subscriber only needs wireless services within a city's boundaries or similar geographical area. For this type of subscriber, a cordless telephone is not powerful enough while full cellular service is too expensive. There is a resulting unforeseen need for a system that offers wireless access throughout an LEC's current switching and network infrastructure.

SUMMARY OF THE INVENTION

The present invention encompasses a wireless access system that enables a local exchange carrier to provide wireless access to subscribers while also providing the benefits of wireline services. The present invention thus provides the benefits of both a cellular or PCS system and a wireline system.

The system of the present invention is comprised of a plurality of cells. Each cell has a base station that is coupled to an antenna for communicating with the mobile radiotelephones within that cell.

A plurality of local exchange carrier (LEC) Class 5 switches are coupled to wireline subscriber units. Additionally, each switch has a plurality of input/output ports, a port being assigned to each radiotelephone that is operating in the system.

A Mobility Node is coupled to the input/output ports on the LEC switches, the cells, and a subscriber database. The subscriber database has a listing of the wireless subscribers registered to operate in that particular system.

The Mobility Node makes the wireless mobiles appear as wireline units to the LECs. This is accomplished by the Mobility Node mapping signals received from the LEC switches to the appropriate radio frequency (RF) protocol for the base station. The Mobility Node also maps signals from the base stations to the appropriate LEC protocol for the LEC switches.

When the system is comprised of multiple Mobility Nodes, the Nodes are coupled by a predetermined protocol link. In the preferred embodiment, the Mobility Nodes are coupled through IS-41 links.

DETAILED DESCRIPTION OF THE PREFERRED EMBODIMENT

The system of the present invention provides wireless access to a local exchange carrier's (LEC) telephone network. This enables the LEC to offer full mobility to its customers within the metropolitan area while still retaining the customer's dialing plans and services from the home wireline office. This is accomplished by making the wireless mobile unit appear as a wireline unit to the LEC.

Figure 1:
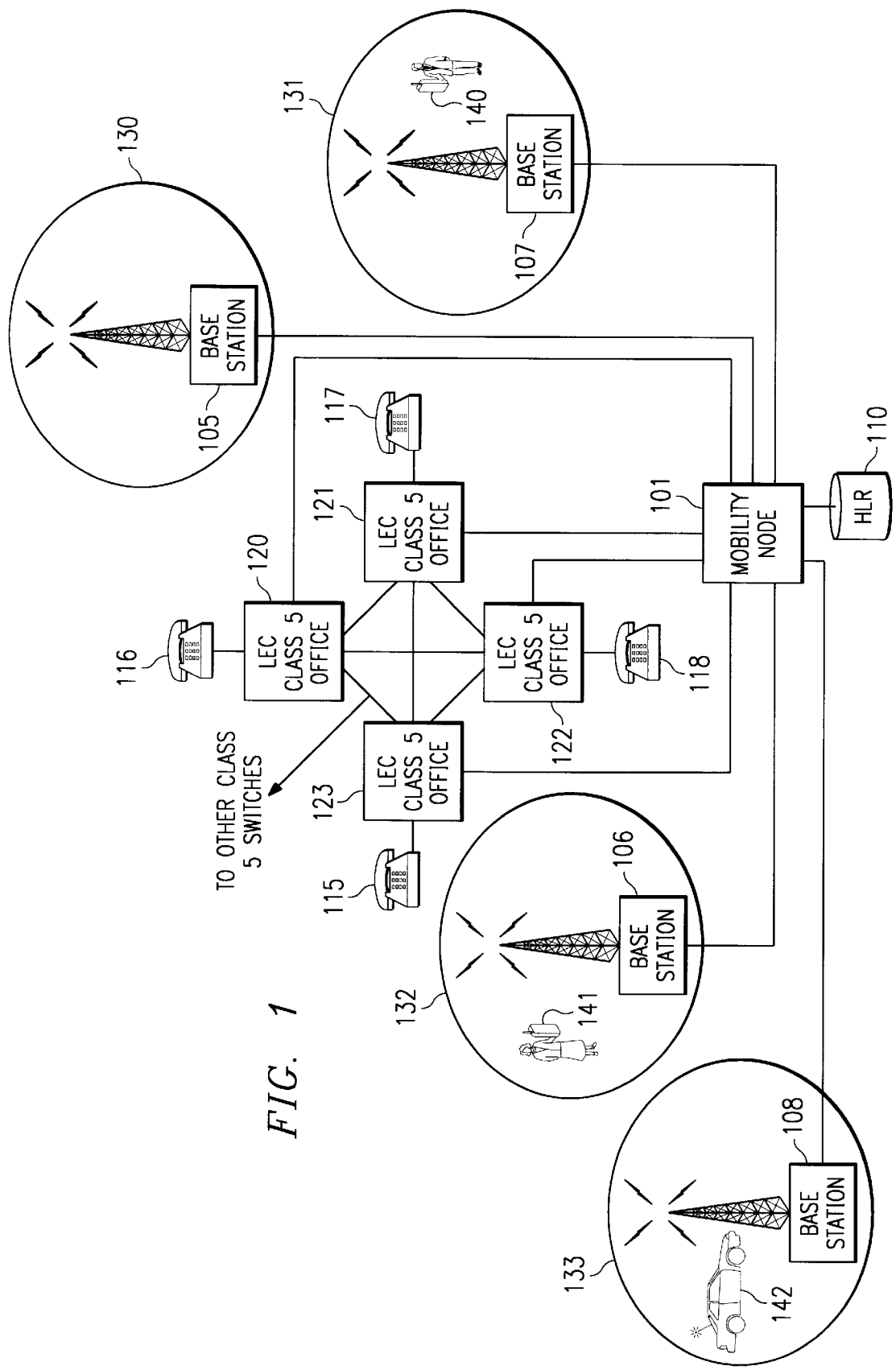
FIG. 1 shows a block diagram of the wireless system of the present invention.

A block diagram of the wireless access system of the present invention is illustrated in FIG. 1. This system is comprised of Class 5 switches (120–123) at the LEC. The switches (120–123) are part of the public switched telephone network (PSTN). These switches (120–123) are well known in the telephony art and will therefore not be described further. The LEC switches (120–123) are further coupled to additional LEC switches in other metropolitan areas.

Wireline subscriber units (115–118) are coupled to the LEC Class 5 switches (120–123). FIG. 1 shows these wireline units (115–118) as being typical wireline telephones as are well known in the art. Additional embodiments include speakerphones, videophones, and computers coupled to modems as being included as a wireline subscriber unit (115–118).

Communication cells (130–133) cover a metropolitan area to provide the wireless communication service to wireless mobile units (140–142). The cells (130–133) of the present invention are similar to the cells used in Advanced Mobile Phone Service (AMPS), Code Division Multiple Access (CDMA), Time Division Multiple Access (TDMA), Global System for Mobile communications (GSM), and other cellular radiotelephone systems.

The cell, in the preferred embodiment, is sectorized. As is well known in the art, this is accomplished by using a number of directional antennas, one directional antenna for each sector, in the approximate center of the cell. An alternate embodiment uses one omnidirectional antenna in the center of the cell to radiate the entire cell.

The antennas are each coupled to a base station (105–108) that is comprised of radio transmitters and receivers. The transmitters and receivers are tuned to the various frequencies allotted for that particular cell in a particular metropolitan system.

A Mobility Node (101) couples the base stations (105–108) to the LEC office switches (120–123). The Mobility Node (101) is similar to a mobile telephone switch that has a processor for handling multiple functions for the base stations including hand-offs and roaming of the radiotelephone.

The Mobility Node (101) of the present invention, however, is capable of advanced features beyond a prior art mobile telephone switch. The Mobility Node (101) also maps wireless protocols to Class 5 switch protocols, thereby making the wireless mobile appear as a wireline telephone to the LEC.

The Mobility Node (101) is coupled to a database referred to as the home location register (HLR) (110). This database keeps track of the wireless subscribers who are registered to operate in the system. This database stores data on the subscriber such as the subscriber's telephone number and the LEC input/output port with which the telephone number is associated.

In the subsequent discussion, the Mobility Node may be referred to either as a home Mobility Node or a visited Mobility Node. The home Mobility Node is associated with the system in which the wireless mobile appears in the system's home location register (HLR). The visited Mobility Node is associated with a system in which the wireless mobile is roaming and therefore is not resident in that system's HLR.

The processes of the present invention are illustrated in FIGS. 2–5. The following descriptions of these processes refer to the block diagram of FIG. 6.

Figure 6:
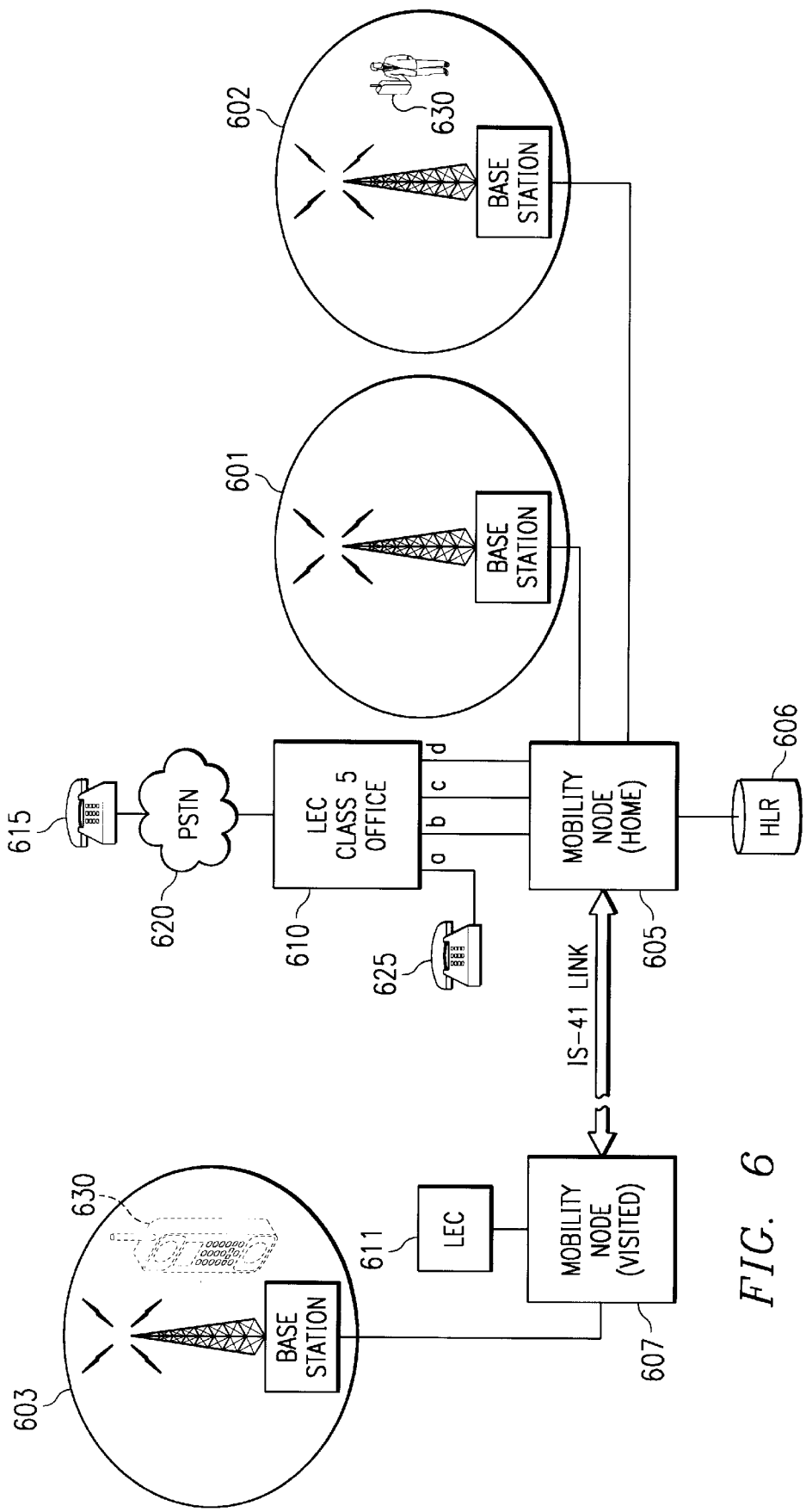
FIG. 6 shows a block diagram of a wireless system utilizing some components of the system illustrated in FIG. 1.

FIG. 6 shows an LEC Class 5 switch (610) coupled to the PSTN (620). The Class 5 switch (610) is coupled to the home Mobility Node (605) through a number of ports, labeled b–d. A wireline subscriber (625) is coupled to the LEC switch (610). In this example, the wireline subscriber (625) is coupled to the switch through port a.

Another wireline subscriber (615), located elsewhere in the public network, is coupled to the LEC switch (610) through the PSTN (620). Even though this subscriber (615) is shown as a wireline subscriber, the subscriber (615) may use any applicable access technology, such as wireless, to be coupled to the PSTN (620).

The two cells (601 and 602) illustrated in FIG. 6 are controlled by the home Mobility Node (605). These cells (601 and 602) provide radio coverage for the LEC office (610) depicted in FIG. 6. As is well known in the art, the cells are the radiation pattern of an antenna driven by a base station. As in the system of FIG. 1, the base station contains transmitters and receivers for communicating, over the antenna, with mobiles within the cell's boundaries.

Another system, typically located in another metropolitan area, is illustrated as being linked to the home system over an IS-41 link. This system is similar to or the same as the home system. For clarity, however, only the visited Mobility Node (607), one LEC switch (611) and a single cell site (603) is illustrated. This system is subsequently referred to as the visited system since it is used to illustrate the concept of the mobile (630) roaming from the home system to the visited system.

Figure 2:
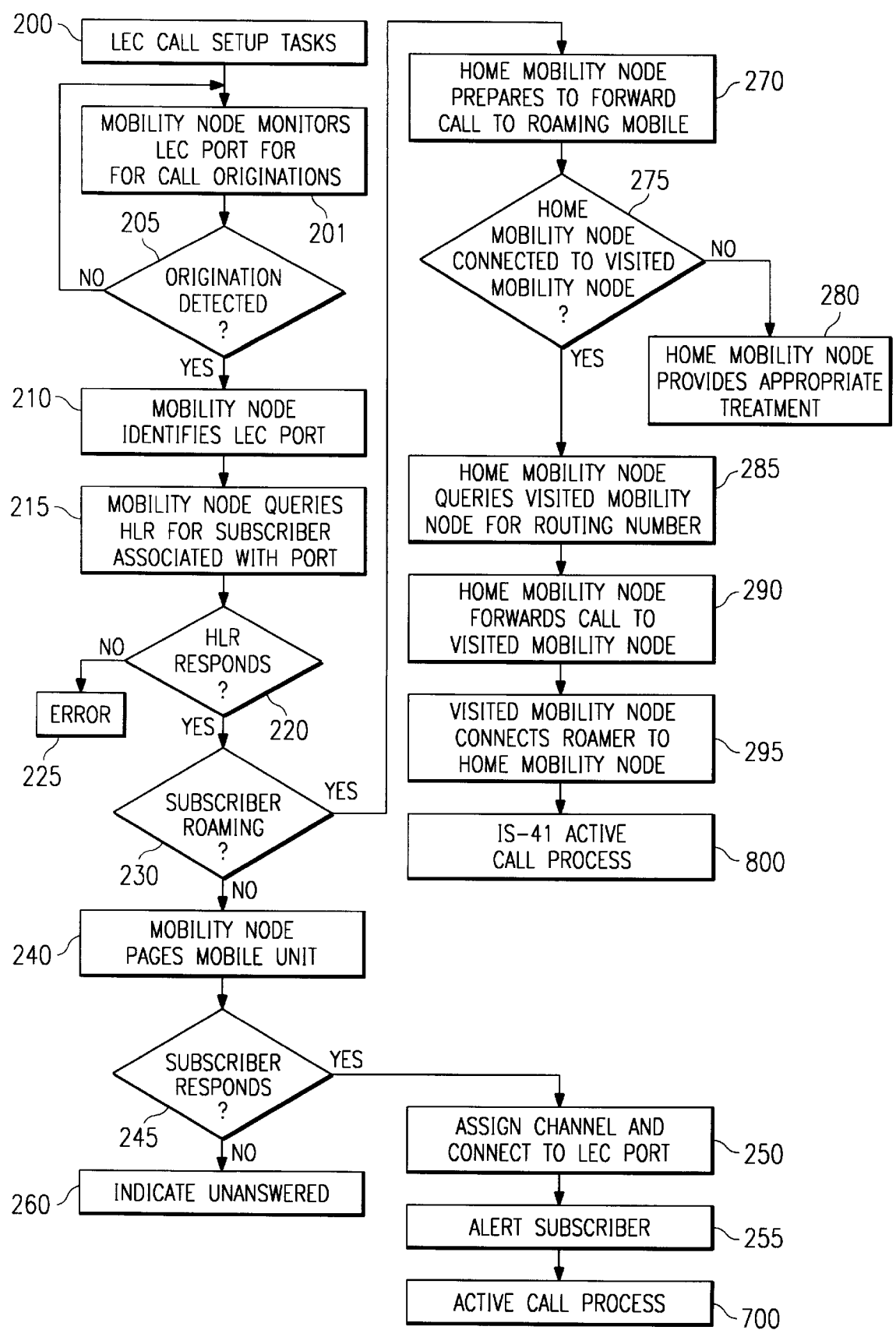
FIG. 2 shows a flowchart of a wireless access process of the present invention for making a call from a local exchange carrier.

A flowchart of a wireless access process of the present invention is illustrated in FIG. 2. This flowchart shows the process for making a call to a wireless mobile unit. In this example, the call is being made by the wireline subscriber (615) of another LEC to the mobile (630).

The process first accomplishes the call setup tasks (step 200). These tasks start with the wireline subscriber (615) originating the call and dialing the directory number (DN) of the mobile (630). The PSTN then routes the call through the public network to the LEC office (610) corresponding to the directory number. The LEC (610) recognizes the directory number of the incoming call as belonging to one of its registered subscribers and originates a call on port b of the Class 5 switch.

The Mobility Node (605) monitors the LEC ports for call originations (step 201). If a call origination is detected (step 205), the Mobility Node (605) identifies that port b of the LEC (610) has been seized (step 210). The Mobility Node (605) then queries the HLR (606) to determine which mobile is associated with that particular port (step 215). If the HLR (606) does not respond (step 220), an error condition exists since the Mobility Node (605) does not know which mobile to page. The Mobility Node then provides an appropriate treatment (step 225) such as a tone or announcement indicating the error condition.

If the HLR (606) responds to the query (step 220), it then must be determined if the mobile is roaming away from the home system (step 230). If the subscriber is not roaming, the home Mobility Node (605) pages the cells (601 and 602) (step 240) and waits for a response (step 245) from the mobile (630). In the preferred embodiment, this response is the same as the response generated by a mobile unit in an AMPS system. Alternate embodiments use other types of responses.

If the mobile (630) does not respond to the page request (step 245), the call is treated as being unanswered (step 260). If the mobile (630) recognizes the page request from the cell (602) and responds (step 245), the home Mobility Node (605) receives the response and performs its normal call setup tasks that includes assigning the mobile (630) to an available channel on the cell (602) and connecting the assigned channel to port b (step 250). The home Mobility Node (605) then causes the mobile unit (630) to ring by transmitting an alert command (step 255) to the mobile.

Figure 7:
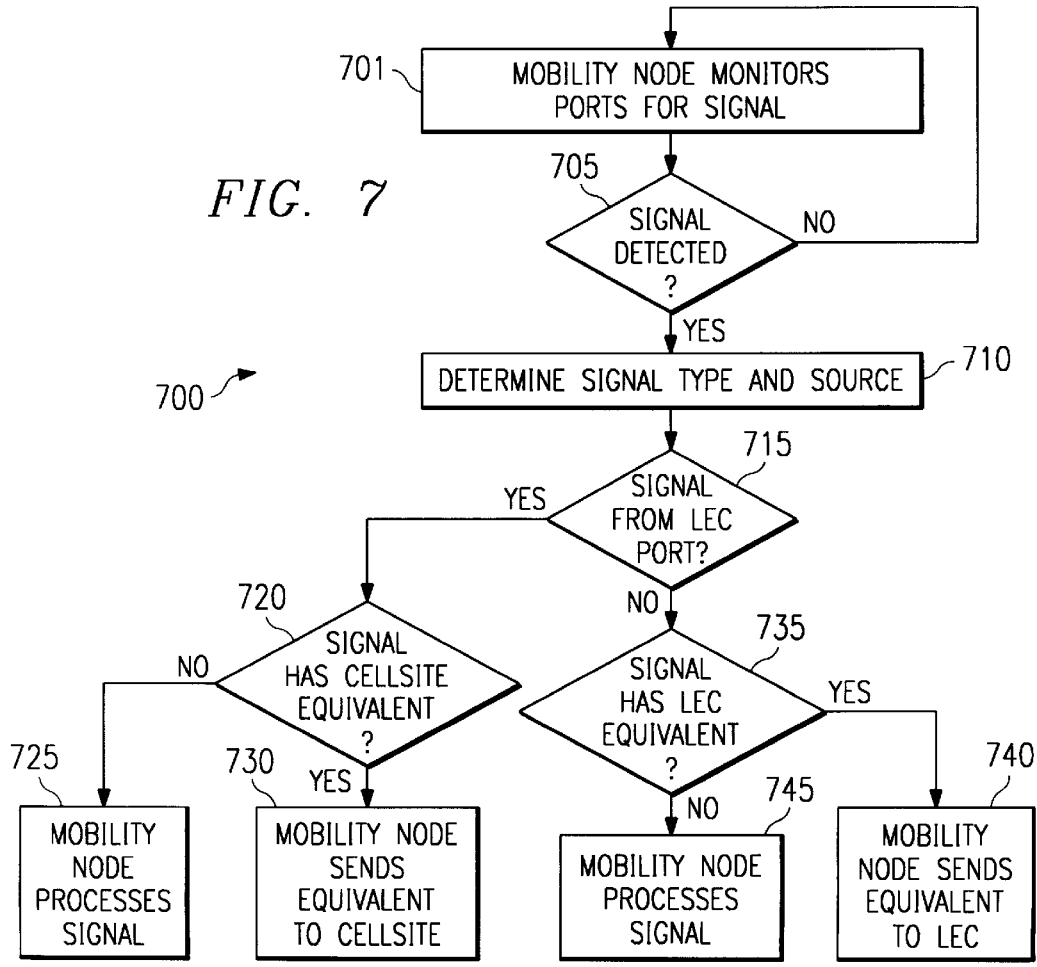
FIG. 7 shows a flowchart of a wireless access process of the present invention in which the Mobility Node converts signals from one protocol to another protocol in a non-roaming situation.

At this point, the mobile subscriber (630) and the calling subscriber (615) are connected and the process goes to the active call process (step 700) illustrated in FIG. 7. If the mobile (630) answers the call or invokes any special services or vertical features (such as conference calls or call waiting), the home Mobility Node (605) transmits the mobile's signals, dialed digits, or other information to the LEC office (610) using the appropriate LEC protocols, making the mobile appear to behave as a wireline unit. These protocols include those well known in the art such as TR303, V5.2, and tip and ring signaling.

Similarly, the home Mobility Node (605) transmits signals, dialed digits, or other information received from the LEC office (610) over port b to the mobile (630) using the appropriate RF protocols such as EIA-553, IS-54, IS-136, and IS-95. These protocols are well known in the art.

FIG. 7 illustrates a flowchart of the active call process (step 700) used by the Mobility Node to make the wireless mobile appear as a wireline subscriber. In this process, the Mobility Node monitors its ports for a signal (step 701). If a signal is not detected (step 705), the monitoring continues.

If the Mobility Node detects a signal (step 705), the Mobility Node then determines the signal type and source of the signal (step 710). If the signal is from the LEC port (step 715), it is then determined if the signal has a cell site equivalent (720). If there is a cell site equivalent to the signal, the Mobility Node sends that equivalent signal to the cell site (step 730) in place of the original signal. Possible signals that have cell site equivalents include an alert signal for the mobile or a disconnect signal. If the signal does not have a cell site equivalent, the Mobility Node processes the signal appropriately (step 725).

If the source of the signal is not the LEC port (step 715), then the signal must have originated from the cell site. In this case, it is determined if the signal has an LEC equivalent (step 735). If there is an LEC equivalent, the Mobility Node sends the LEC equivalent of the signal to the LEC (step 740) in place of the original signal. Equivalent signals that are sent to the LEC include dialed digits, flashes, and disconnect signals.

If there is no LEC equivalent for the signal, the Mobility Node processes the signal (step 745). Examples of signals that are processed by the Mobility Node are mobile hand-off and mobile authentication.

In the preferred embodiment of the system of the present invention, Mobility Nodes are coupled through IS-41 links. This enables the home and visited Mobility Nodes (605 and 607) to communicate with each other to transfer calls and other information. Alternate embodiments use protocols other than IS-41 to link the Mobility Nodes.

Referring again to the process of FIG. 2, if the subscriber is roaming (step 230), the home Mobility Node prepares to forward the call to the roaming mobile (step 270).

If the home Mobility Node (605) is not coupled to the visited Mobility Node (607) (step 275), the home Mobility Node (605) is unable to forward the call and provides the appropriate processing (step 280) of the call in place of the visited Mobility Node (607). This processing includes, for example, an announcement that the mobile is not within the region.

If the home Mobility Node (605) is connected to the visited Mobility Node (607) (step 275), the home Mobility Node (605) queries the visited Mobility Node (607) to determine the routing number (step 285). The routing number is a temporary directory number assigned to the mobile that associates the mobile, with an incoming call, to the visited Mobility Node (607).

The home Mobility Node (605) then forwards the call to the visited Mobility Node (607) (step 290) via a direct connection to the PSTN (not shown) using the routing number. The visited Mobility Node (607) pages the mobile and connects the roaming mobile to the home Mobility Node (605) (step 295).

Figure 8:
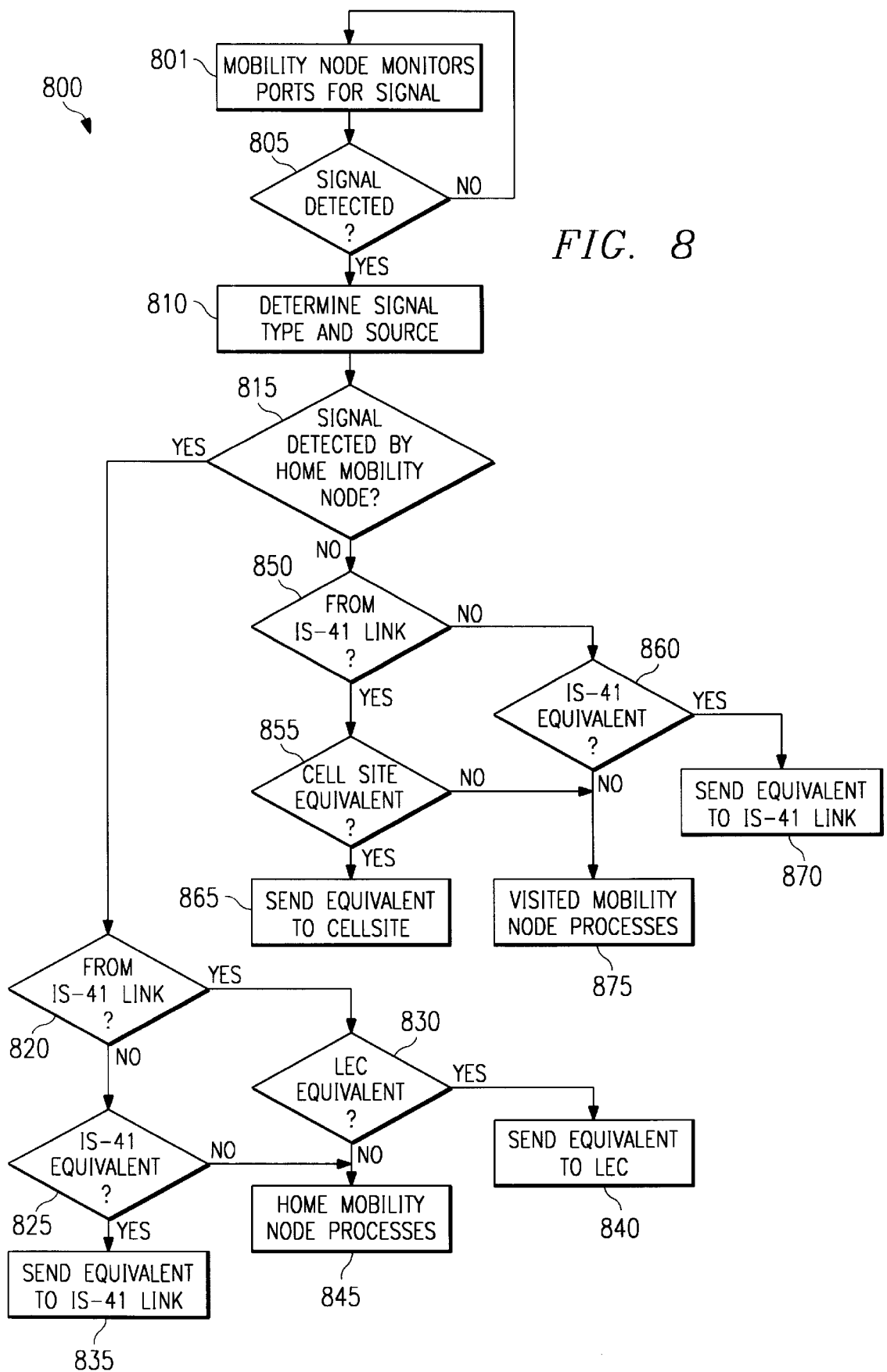
FIG. 8 shows a flowchart of another wireless access process of the present invention in which the Mobility Node converts signals from one protocol to another protocol in a roaming situation.

After the roaming mobile is connected to the home Mobility Node (step 295), the process continues to a modified active call process (step 800) illustrated in detail in FIG. 8. This process monitors the IS-41 protocol that connects the Mobility Nodes and maps it to the proper protocol to communicate with the LEC and the visited base station.

FIG. 8 illustrates a flowchart of the IS-41 active call process (process 800) used by the Mobility Node to make the wireless mobile appear as a wireline subscriber. In this process, the Mobility Node monitors its ports for a signal (step 801) from other Mobility Nodes. If a signal is not detected (step 805), the monitoring continues.

If the Mobility Node detects a signal (step 805), the Mobility Node then determines the signal type and source of the signal (step 810). If the signal is not detected by the home Mobility Node (step 815) it must have been detected by the visited Mobility Node. It is then determined if the signal came from the IS-41 link (step 850).

If the signal is from the IS-41 link, it is then determined if the signal has a cell site equivalent (step 855). If there is a cell site equivalent to the signal, the visited Mobility Node sends that equivalent signal to the cell site (step 865) in place of the original IS-41 signal. Possible signals that have cell site equivalents include an alert signal for the mobile or a disconnect signal. If the signal does not have a cell site equivalent, the visited Mobility Node processes the signal appropriately (step 875).

If the source of the signal is not the IS-41 link (step 850), the signal is from the cell site. It is then determined if the signal has an IS-41 equivalent (step 860). If there is an IS-41 equivalent, the visited Mobility Node sends the IS-41 equivalent of the signal to the IS-41 link (step 870) in place of the original signal. If there is no IS-41 equivalent for the signal, the visited Mobility Node processes the signal appropriately (step 875). An example of a signal that is processed by the visited Mobility Node is a mobile hand-off.

If the signal is detected by the home Mobility Node (step 815), it is determined if the signal is from the IS-41 link (step 820). If the signal is from the IS-41 link, it is determined if the signal has an LEC equivalent (step 830). If so, that equivalent is sent to the LEC in place of the original signal (step 840). If there is no equivalent, the home Mobility Node processes the signal appropriately (step 845).

If the signal is not from the IS-41 link (step 820), it is from the LEC. It is then determined if there is an IS-41 equivalent for the signal (step 825). If so, that signal is sent to the link (step 835). If no equivalent signal exists, the home Mobility Node processes the signal appropriately (step 845).

The mobile (630) of FIG. 6, on power-up and periodically thereafter, registers with the system through the cell with which the mobile is currently communicating. The registration process, identical to the AMPS registration process in the preferred embodiment, comprises the mobile (630) sending its directory number and electronic serial number to the base station. Alternate embodiments use other registration processes.

The mobile registration enables the Mobility Node (605) to know in which cell(s) the mobile is currently located and, therefore, in which cell(s) the mobile (630) is to be paged. Since the mobile might be on the border between cells, it is possible that the mobile may be locked on to a cell that is different from the one with which it last registered.

Figure 3:
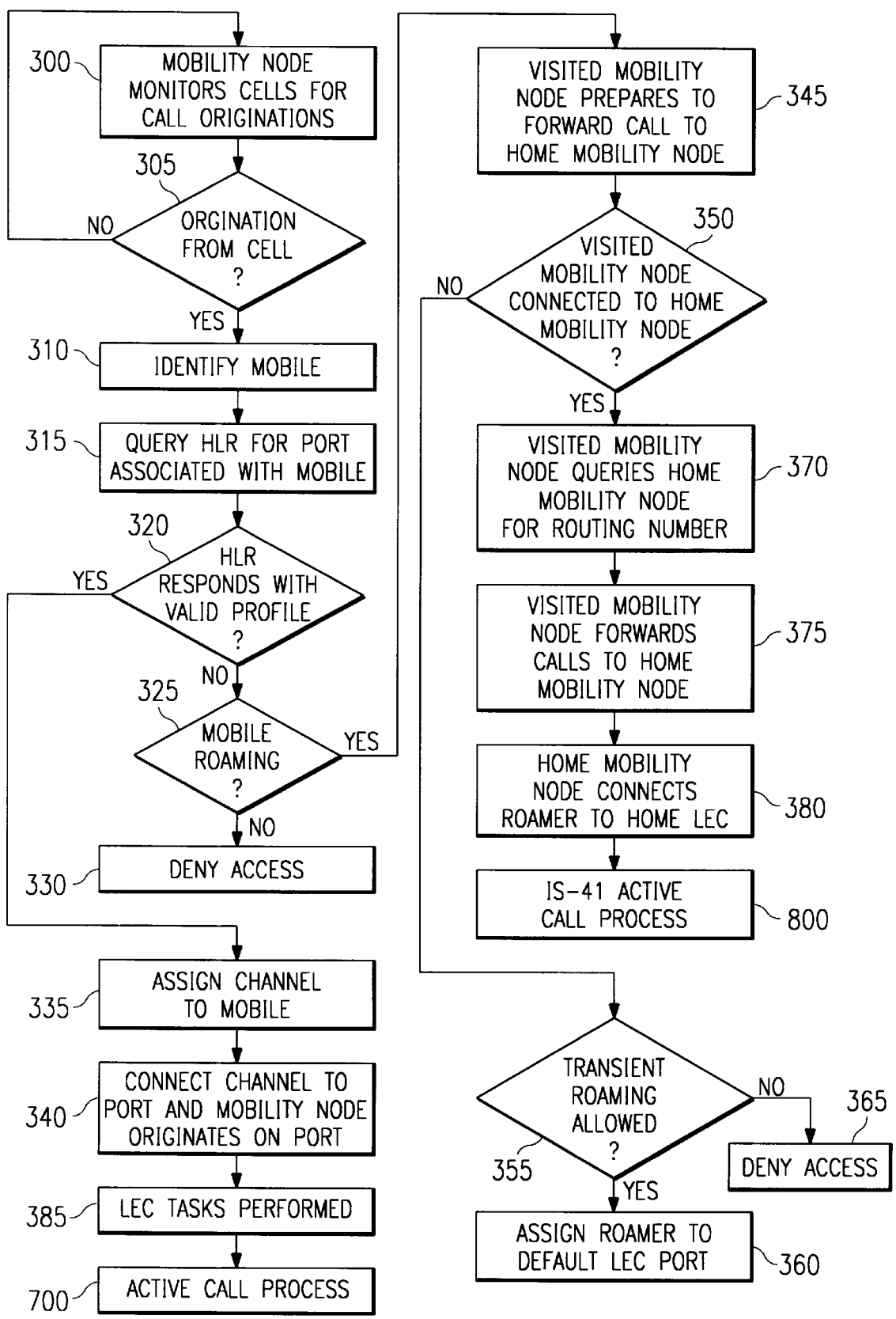
FIG. 3 shows a flowchart of a wireless access process of the present invention for making a call from a wireless mobile.

FIG. 3 illustrates a flowchart of a process in which a call is originated by the wireless mobile (630), illustrated in FIG. 6, to the wireline subscriber (625). The home Mobility Node (605) continuously monitors the cells (601 and 602) for call originations (steps 300 and 305).

When the home Mobility Node (605) recognizes the origination from the mobile (630) over the cell (602), the home Mobility Node (605) then determines if the mobile (630) is one of the LEC office's subscribers (step 310) by sending a query that includes the mobile identification number to the HLR (606) (step 315).

The process then checks if the HLR (606) responded with a valid profile on the wireless subscriber (step 320). If the HLR (606) responds with a valid information profile, the Mobility Node (605) then performs its normal call setup tasks (step 335) that includes assigning the mobile (630) to an available channel on the cell. In the preferred embodiment, the call setup tasks are identical to those used by AMPS. Alternate embodiments use other call setup tasks. The Mobility Node (605) then connects the assigned channel to port b and originates a call on the port (step 340) using the directory number dialed by the mobile.

The LEC office (610) then performs its normal call set-up tasks (step 385). The LEC office (610) recognizes the origination on port b, translates and routes the directory number, terminates the call on the wireline subscriber's telephone (625), and causes the wireline telephone (625) to ring by sending a ring signal to the telephone.

At this point, the mobile subscriber and the wireline subscriber are connected and the process continues with the active call process (step 700) illustrated in FIG. 7. If the wireline telephone answers the call or if the mobile subscriber invokes any special services or vertical features, the Mobility Node transmits the mobile's signals, dialed digits, or other information to the LEC office, using the appropriate LEC protocols, making the mobile appear as a wireline unit. These protocols include those well known in the art such as TR303, V5.2, and tip and ring signaling.

Similarly, the Mobility Node transmits signals, dialed digits, or other information received from the LEC office port b to the mobile using the appropriate RF protocols for that transaction. These protocols include IS-54, IS-136, and IS-95. As described above, the process illustrated in FIG. 7 describes in detail how the Mobility Node makes the mobile appear as a wireline unit.

If the HLR (606) does not respond with a valid profile on the wireless subscriber (step 320), the process determines if the mobile is roaming (step 325) in the service area. If the mobile (630) is not roaming, service access is denied (step 330) since the subscriber is neither a valid home system user nor a valid roamer. In the preferred embodiment, the Mobility Node (605) transmits a signal to the mobile (630) indicating denied service. Alternate embodiments simply ignore all service requests by the mobile.

If the mobile is found to be a valid roaming unit (step 325), the visited Mobility Node (607) prepares to forward the call to the home Mobility Node (605) (step 345). It is then determined if the visited Mobility Node (607) is coupled through an IS-41 link, or other protocol link, to the home Mobility Node (605) (step 350). If the home and visited Mobility Nodes (605 and 607) are coupled, the visited Mobility Node (607) queries the home Mobility Node (605) for the routing number (step 370). The routing number is a temporary directory number given to the mobile (630) that associates an incoming call to the home Mobility Node with a designated port in the LEC (610).

The visited Mobility Node (607) then forwards the call to the home Mobility Node (605) (step 375), via a direct connection to the PSTN (not shown), using the routing number. The home Mobility Node (605) connects the incoming call to the designated port on the home LEC (610) (step 380).

The roaming mobile (630) is now in a call through the home Mobility Node (605). The process of the present invention now performs the required protocol changes to make the mobile appear as a wireline unit. This process is described above in FIG. 8.

If the home and visited Mobility Nodes (605 and 607) are not coupled (step 350), it is determined if the system allows roaming by transient mobiles (step 355). If roaming is not allowed, service access by the roaming mobile (630) is denied (step 365). If roaming is allowed, the roaming mobile (630) is assigned to a default LEC port on the visited LEC (step 360). The roaming mobile (630) can then use this port to access the PSTN for outgoing calls only.

Figure 4:
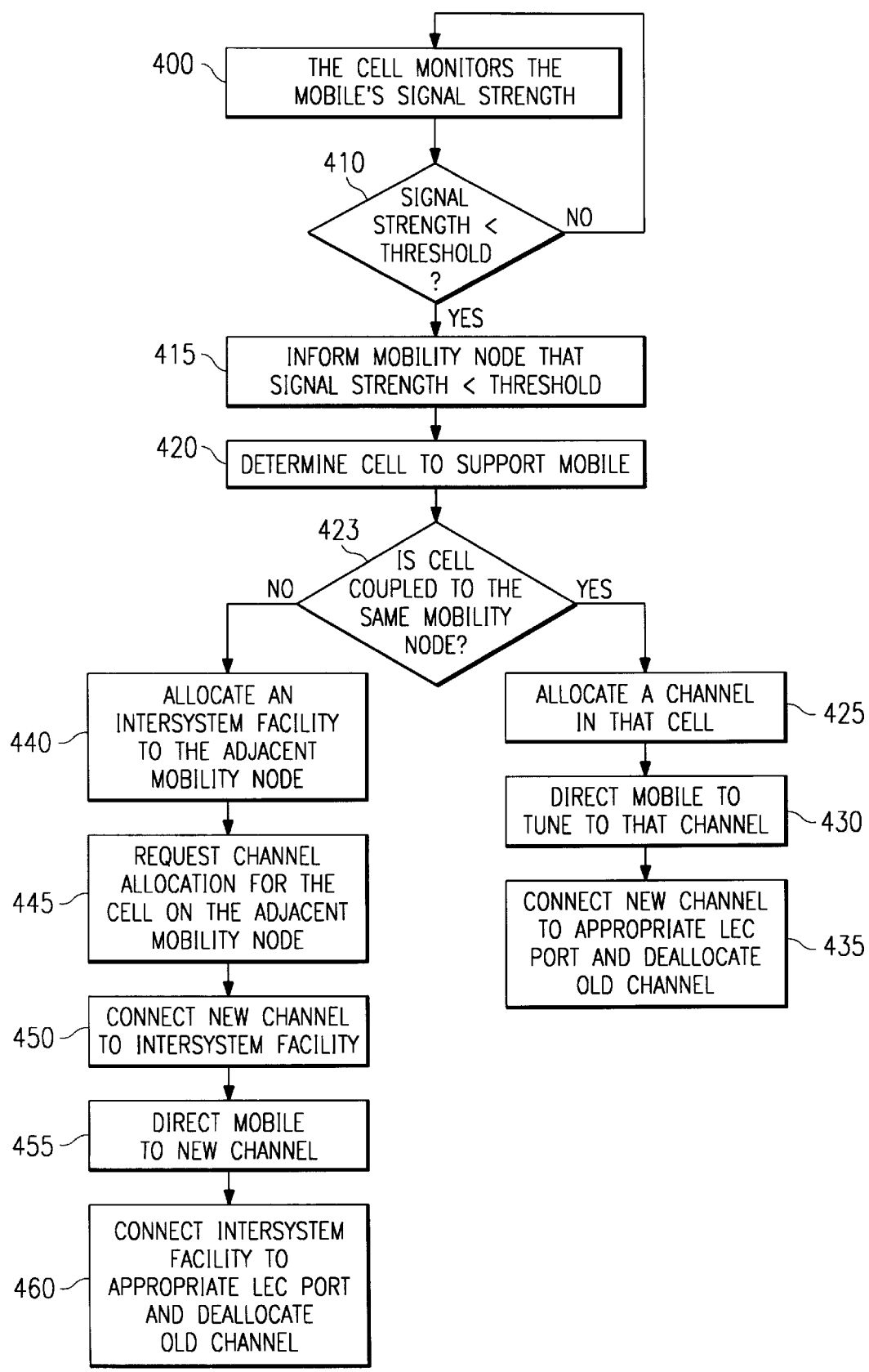
FIG. 4 shows a flowchart of a wireless access process of the present invention for performing a hand-off of a wireless mobile.

FIG. 4 illustrates a flowchart of a process in which a wireless mobile (630), illustrated in FIG. 6, is handed off from one cell (602) to another cell (601 or 603). Once the mobile (630) is tuned to a radio channel, it can take advantage of all the hand-off capabilities supported by the Mobility Node (605) and the RF technology for which the mobile is designed.

In the hand-off process illustrated in FIG. 4, the cell (602) continuously monitors the mobile's signal strength (step 400). When the signal strength falls below a predetermined threshold (step 410), the cell (602) informs the Mobility Node (605) (step 415).

The Mobility Node (605) queries the surrounding cells to determine which cell is capable of communicating with the mobile (step 420). In this example, the nearby cell (601 or 603) is found to be able to support the mobile.

It is then determined if the nearby cell is coupled to the same Mobility Node (605) as the serving cell (step 423). If the nearby cell is coupled to the same Mobility Node (605), the Mobility Node (605) allocates a channel on this cell (601) (step 425) and directs the mobile (630), through the current cell (602), to retune to the new channel (step 430).

The Mobility Node (605) then connects the new channel to port b of the LEC switch. Once the mobile (630) arrives on the new channel supported by the new cell (601), the old channel on the first cell (602) is deallocated (step 435).

If the nearby cell is not coupled to the same Mobility Node (step 423), an intersystem facility is allocated to the adjacent Mobility Node to which the cell is coupled (step 440). The intersystem facility, in the preferred embodiment, is an IS-41 link. Alternate embodiments use other protocol links between the Mobility Nodes.

A channel is then requested for the nearby cell that is coupled to the adjacent Mobility Node (step 445). The new channel is then connected to the intersystem facility (step 450). The mobile (630) is directed to retune to the new channel (step 455). The intersystem facility is then connected to the appropriate LEC port and the old channel is deallocated (step 460).

This hand-off activity is completely transparent to the LEC office. Any services in effect in the LEC office are unaffected by this hand-off. The only difference the mobile subscriber might experience is the brief muting of the conversation that may occur during the hand-off using AMPS or TDMA technology.

The above described hand-off process is one of many embodiments. There are multiple sequences and triggers possible for alternate hand-off processes.

Figure 5:
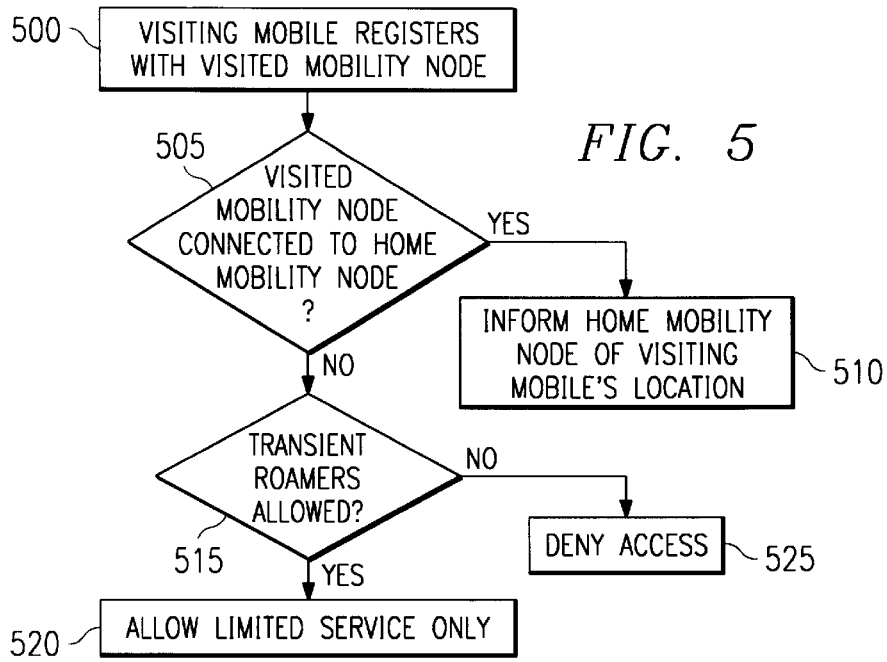
FIG. 5 shows a flowchart of a wireless access process of the present invention in which a roaming wireless mobile registers with a visited system.

FIG. 5 illustrates a flowchart of a process in which a roaming, wireless mobile (630), illustrated in FIG. 6, registers in a visited system (603, 607, and 611). If the mobile roams outside the coverage area of the home Mobility Node (605) and any systems connected to the home Mobility Node, it no longer has access to its services in the LEC office.

The roaming mobile (630) first registers with the visited Mobility Node (607) (step 500). It is then determined if the visited Mobility Node (607) is coupled to the home Mobility Node (605) (step 505), either through an IS-41 line or other appropriate protocol interface.

If the visited Mobility Node (607) is coupled to the home Mobility Node (605), the home Mobility Node (605) is informed of the roaming mobile's location (step 510). This enables the home Mobility Node (605) to find the roaming mobile (630) in the event of a call termination from the home system.

If the home and visited Mobility Nodes (605 and 607) are coupled, a call received by the home LEC office (610) for the mobile is directed to the home Mobility Node (605) as normal. In this case, the home Mobility Node (605) is aware that the mobile is roaming and has the option to either block the call or forward it through the PSTN to the visited Mobility Node (607).

The call can be blocked by the home Mobility Node (605) in a number of ways. The home Mobility Node (605) can send an announcement or tone back to the LEC office (610) indicating that the call is being blocked. Alternatively, the home Mobility Node (605) can also connect the incoming call from the LEC to a null termination that does not answer. This enables the LEC office (610) to activate services such as call forward.

If the call is forwarded by the home Mobility Node (605), the forwarding process is accomplished by the standard call delivery mechanisms in the intersystem networking protocols. In this case, the home Mobility Node (605) queries the visited system (603, 607, and 611) for a roaming number associated with the visiting mobile (630). The home Mobility Node (605) then forwards the call to the visited Mobility Node (607) via a direct connection to the PSTN (not shown in FIG. 6).

If the visited Mobility Node (607) is not coupled to the home Mobility Node (605), it is determined if the visited system allows transient roamers (step 515). If transient roaming mobiles are not allowed in the visited system, service access is denied (step 525). This is communicated to the roaming mobile either through a signal (tone or announcement) or simply denying access to the system by the mobile.

If the visited system (603, 607, and 611) allows roaming mobiles, the visited Mobility Node (607) provides limited service access to the roaming mobile (step 520). Since the visited Mobility Node (607) does not have access to the roaming mobile's home subscriber data, the visited Mobility Node (607) only provides a default subscriber profile for the roaming mobile. This default profile has a limited set of service options such as call origination and standard dialing plans. The mobile is limited to these service options when making calls in the visited system (603, 607, and 611). The mobile cannot access any features or update any subscriber data in his home LEC office (610), nor can it receive calls.

Figure 9:
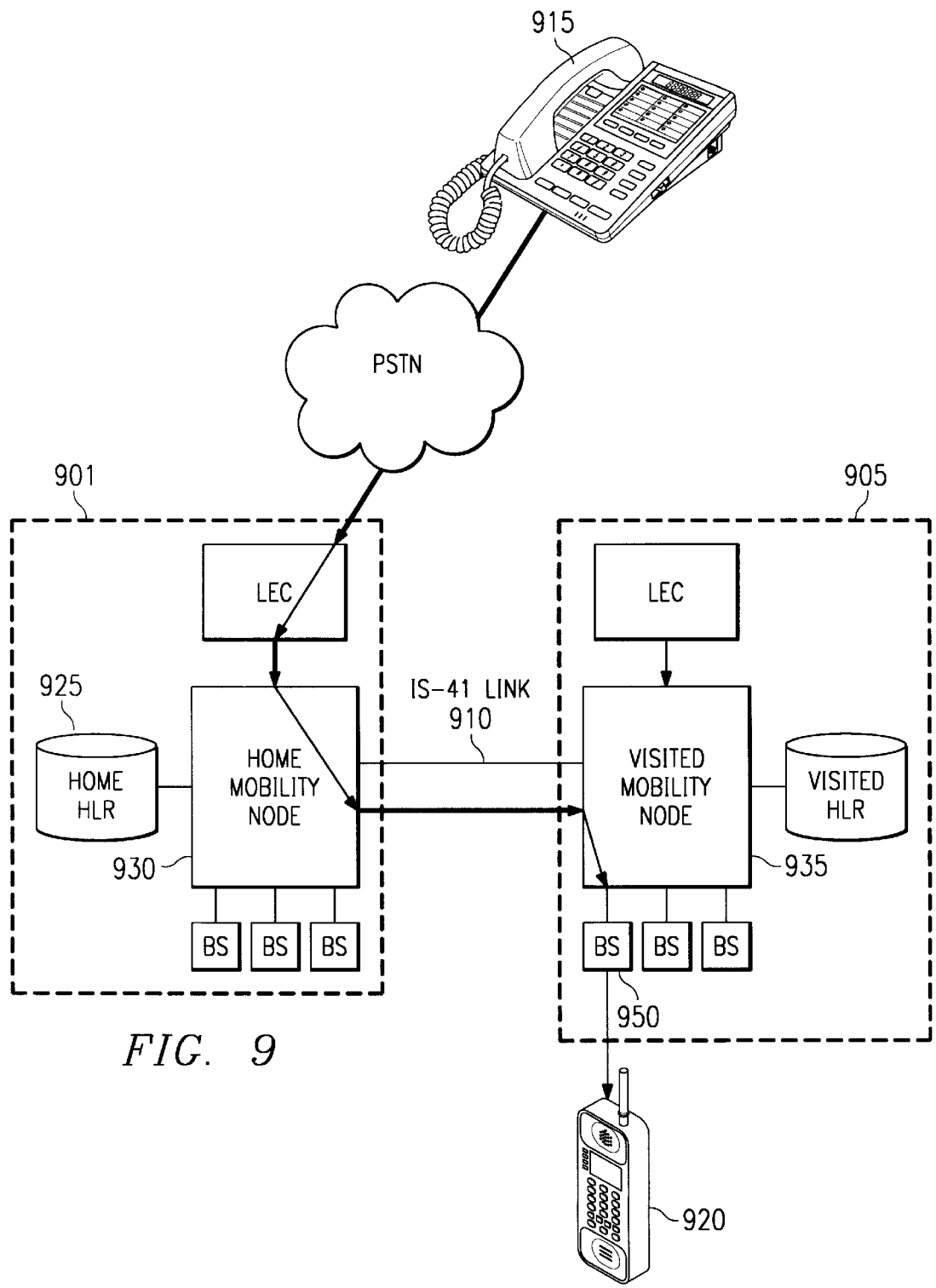
FIG. 9 shows a block diagram illustrating a voice path through wireless, interlinked communication systems.

FIG. 9 illustrates an example of a voice path through multiple wireless systems that are linked through an IS-41 link. This link is the result of either a call to or from a roaming mobile or as a result of a hand-off between two Mobility Nodes. Two systems are shown, the home system (901) and the visited system (905). The two systems are linked over the IS-41 link (910).

This embodiment illustrates the routing of a call, using the above described processes, from a wireline subscriber (915) to a wireless mobile (920) roaming away from the home system (901). The call from the wireline unit is routed through the PSTN to the wireless mobile's home system (901) in which the mobile is resident in the HLR (925). The home Mobility Node (930), knowing that the mobile (920) is roaming in another system, routes the call over the IS-41 link (910) to the visited system's Mobility Node (935). The visited Mobility Node (935) then performs the appropriate processes to route the call to the roaming mobile (920) through the appropriate base station (950).

In summary, the system and processes of the present invention provide wireless access to an existing LEC network throughout a metropolitan area and through other networks connected to that network. Unlike other wireless adjunct solutions, the present invention offers full mobility and direct access to wireline services and eliminates the infrastructure and signaling requirements associated with the Generic-C standards (i.e., AIN and ISDN).

The present invention is independent of access technology and RF spectrum. The present invention can use Advanced Mobile Phone Service (AMPS), Time Division Multiple Access (TDMA), Code Division Multiple Access (CDMA), Global System for Mobile communications (GSM) or any other access technology in any frequency band.

The present invention supports both stand-alone and networked applications allowing the LEC operators to customize the roaming options they offer to their subscriber base. These options can range from fixed wireless access to nation-wide and global roaming.

I claim:

1. A wireless access system that enables a local exchange carrier to provide wireless access to wireline services by a mobile radiotelephone, the system comprising:

a plurality of cells, each cell comprising a base station and antenna for communicating with the radiotelephone;

a first set of local exchange carrier switches, each switch of said first set of local exchange carrier switches having a first set of input/output ports and a second set of input/output ports, each input/output port of said first set of input/output ports being assigned to a radiotelephone, each input/output port of said second set of input/output ports being coupled to a wireline subscriber unit, the first set of local exchange carrier switches coupled to other sets of local exchange carrier switches; and a Mobility Node connected to the input/output ports of said first set of input/output ports of each switch of said set of local exchange carrier switches, at least on cell of the plurality of cells, and a subscriber database, each Mobility Node additionally connected, through a predetermined protocol line, to other Mobility Nodes of the plurality of Mobility Nodes, each Mobility Node comprising a processor that converts predetermined signals from a first protocol to a second protocol.

2. The system of claim 1 wherein the predetermined protocol line is an IS-41 line.

3. The system of claim 1 wherein the first protocol is a radio frequency protocol and the second protocol is a local exchange carrier protocol.

4. The system of claim 3 wherein the radio frequency protocol is IS-95 and the local exchange carrier protocol is TR303.

5. The system of claim 1 and further including each Mobility Node having a capability for handling hand-offs of the mobile radiotelephone from a first cell to a second cell, each of the plurality of cells.

6. A method for a local exchange carrier to provide wireline services to a mobile radiotelephone through a local exchange carrier Class 5 office switch, the mobile radiotelephone communicating with base stations that are coupled to a port of the Class 5 office switch assigned to said mobile radiotelephone through a port of a Mobility Node assigned to said mobile radio telephone, the method comprising the steps of:

monitoring, for a received signal, the port in the Mobility Node;

if the received signal is from a Class 5 office switch, transforming the received signal from a local exchange carrier protocol signal to a radio frequency protocol signal; and if the received signal is from a base station, transforming the received signal from a radio frequency protocol signal to a local exchange carrier protocol signal.

7. The method of claim 6 and further including the step of the Mobility Node processing the received signal if an equivalent protocol does not exist to which the received signal can be mapped.

* * * * *